May 13, 1952   F. E. TUTTLE ET AL   2,596,740
APPARATUS FOR PHOTOGRAPHING AND EXHIBITING A MULTIPLICITY
OF DIFFERENT PICTURES IN SUCCESSION
Filed Nov. 17, 1949   4 Sheets-Sheet 1

FORDYCE E. TUTTLE
WILLIAM BORNEMANN
INVENTORS

BY
ATTORNEYS

May 13, 1952 — F. E. TUTTLE ET AL — 2,596,740
APPARATUS FOR PHOTOGRAPHING AND EXHIBITING A MULTIPLICITY OF DIFFERENT PICTURES IN SUCCESSION
Filed Nov. 17, 1949 — 4 Sheets-Sheet 2

FORDYCE E. TUTTLE
WILLIAM BORNEMANN
INVENTORS

FORDYCE E. TUTTLE
WILLIAM BORNEMANN
INVENTORS

BY
ATTORNEYS

Patented May 13, 1952

2,596,740

UNITED STATES PATENT OFFICE 2,596,740

APPARATUS FOR PHOTOGRAPHING AND EXHIBITING A MULTIPLICITY OF DIFFERENT PICTURES IN SUCCESSION

Fordyce E. Tuttle and William Bornemann, Rochester, N. Y., assignors to Eastman Kodak Company, Rochester, N. Y., a corporation of New Jersey Application November 17, 1949, Serial No. 127,851

13 Claims. (Cl. 88—16)

1

The present invention relates to photography, and particularly to an apparatus for photographing and exhibiting a multiplicity of different pictures in succession on a single area of a light-sensitive surface.

The primary object of the present invention is to provide an apparatus for carrying out the method of photographing and exhibiting a multiplicity of different pictures disclosed and claimed in U. S. patent application Serial No. 127,852, filed on even date herewith.

One object of the present invention is to provide a camera for photographing a multiplicity of different pictures on a single frame of light-sensitive film, each picture having substantially the same overall dimensions as the frame of film exposed.

Another object is to provide a camera including a scanning disk through which the individual exposures are made on the film as composite pictures in the form of dot patterns, said film and scanning disk being moved relative to one another during or between exposures, depending upon whether motion pictures or merely different still subjects, respectively, are to be photographed.

And yet another object is to provide a camera of the type described which is particularly adapted for taking high-speed motion pictures, and in which said scanning disk is rotated at relatively high speed in front of the film plane during exposure; and a capping shutter mechanism is associated with the scanning disk to control the film exposure and prevent double exposure of the film.

And still a further object is to provide a camera of the type set forth in which the capping shutter can be selectively rendered inoperative so that the camera can be used to take a plurality of different still subjects on the same frame of film, or can be used to take motion pictures of subjects whose movement is not fast enough to require the use of the capping shutter; or, so that the camera can be used as an exhibiting device for exhibiting pictures taken by the user thereof.

And, another object is to provide a camera of the type disclosed in which the capping shutter rotates with the scanning disk and is indexed relative to the disk by a spring to effect the exposures, and in which means are provided for selectively adjusting the tension of the driving spring for the capping shutter in accordance with different selected exposure speeds.

Still another object is to provide a camera by

2 which a minimum of 900 different composite pictures may be made on a single 4″ x 5″ film frame in succession intermittently, or at the rate of over 1,000,000 pictures per second.

And, another object is to provide a camera of the type described which includes a novel means for readily loading a film into the same and accurately locating it in the focal plane of the taking lens.

A further object of the present invention is to provide a camera of the type described which can also be used as an exhibitor for the frame of film exposed in the device when used as a camera.

The novel features that we consider characteristic of our invention are set forth with particularity in the appended claims. The invention itself, however, both as to its organization, and its methods of operation, together with additional objects and advantages thereof, will best be understood from the following description when read in connection with the accompanying drawings, in which:

Like reference characters refer to corresponding parts throughout the drawings.

The present invention relates to a camera for carrying out the method of photography disclosed and claimed in copending application Serial Number 127,852, filed on even date herewith, and since an understanding of said method will facilitate an understanding of the purpose and function of the present camera, it will be reviewed herein. This method of photography concerns the production of a composite picture made up of widely displaced silver deposits with unexposed areas between them, much larger than the deposit size. The spacing of these silver deposits or elements making up one composite picture are so coarse as to provide room in the neighborhood of each for elements to be used for a great many more pictures; in the arrangement to be described, 899 other pictures. Such composite pictures are exposed on a given frame of a light-sensitive film by placing in the focal plane of a camera, and in front of the film, a scanning member provided with a great many minute apertures so distributed over the scanning member as to cover the entire area of the film in any one relative position of the scanning member and film. Such an exposure results in a composite picture made up of a multiplicity of separated silver deposits in the form of dots which, when developed or processed to a visible image and viewed in combination, give a complete image of the subject in which good definition, and even continuous tone effects as distinguished from a pattern of individual dots, are possible.

Since the making of such a composite picture requires the exposure of but a very small percentage of the entire area, then a great many such exposures can be made on a single frame of film if the exposures are made through a scanning member which positively selects for exposure only those elements or dots which constitute related parts of a picture. If each aperture (the scanning member as a whole) is translated to a new, non-overlapping position, unexposed emulsion is uncovered for the recording of an entirely new picture, while, at the same time, the scanning member covers the emulsion areas previously exposed. This method requires two-dimensional scanning of the focal plane, as distinguished from one-dimensional scanning as in grid type composite pictures described in copending patent application Serial No. 114,352, filed September 7, 1949, now Patent No. 2,578,327, issued December 11, 1951, since the composite picture, in this case, is made up of dot elements rather than linear strips.

Each of these composite pictures will preferably be made up of many thousands of individual minute dot elements, and each will have substantially the same overall dimensions as the frame of film. For instance, we have found, and this invention relates to, a camera by which it can be carried out, that a minimum of 900 different composite pictures can be exposed on a single 4" x 5" photographic plate, each composite picture being substantially 4" x 5" in overall dimensions. While these composite pictures when viewed by transmitted light through a scanning disk like that through which they were exposed will appear similar to well-known, half-tone pictures, and as good definition can be achieved as in half-tone pictures, they are not the equivalent of half tones in any sense of the word. Whereas in half-tone pictures the individual dots vary in size and density to produce the final image, in a composite picture made according to the present invention all of the dot elements will be of the same size and in each dot element there may be definition and resolution of the part of the image included in a single dot element.

Obviously, when the frame of film containing this multiplicity of composite pictures is processed to make the latent images visible, the processed film will appear to possess a maze of dots which mean nothing. However, if this processed film is viewed by transmitted light through the scanning member through which it was exposed, or an analyzing member similarly constructed, after properly registering the two, then the different groups of dot elements making up the different composite pictures will be simultaneously uncovered to bring out the different pictures. By moving the scanning member and the processed film relative to one another in precisely the same manner as was done in making the exposure, then a sequence of different pictures will be visible to the viewer. The best results are obtained by making these composite pictures in the form of transparencies and viewing them through the scanning member by transmitted light. If the original subject is a black-and-white drawing, or the like, the exposed film need only be processed to a negative transparency to be intelligible. However, if the subject is of such nature as to be viewed as a positive in order to be intelligible, then the exposed film can be developed to a negative transparency and be printed and processed to a positive transparency. It should be pointed out that these composite pictures possess the desired definition only when viewed by transmitted light, rather than by reflected light, for then the light passing through the individual dot-like apertures of the scanning disk spreads out and the individual dot-like picture elements appear larger than they actually are and the separation between them is effectively reduced to practically eliminate the appearance of the image as a dot pattern when viewed from a reasonable distance. It will thus be seen that with this method of photography a great many different subjects can be photographed on a single film area and viewed selectively one after the other, for any number of reasons such as for advertising purposes.

It follows that if these multiplicity of composite pictures can be taken on a single frame of film in such a manner as to have each successive picture represent a different position of a moving subject, then a motion sequence can be placed on a single frame of film and be viewed through an analyzing member like the scanning member through which the exposures are made in order to obtain a motion picture. According to the present invention, this is accomplished by continuously moving the scanning member relative to the film during exposure at a speed commensurate with the speed of motion in the subject to be recorded. It has also been found that this method of recording motion pictures is adaptable to taking pictures at a very rapid rate of speed, i. e., three million per second, so that it can be used for recording the motion of very fast moving subjects, such as projectiles, wave fronts of explosions, etc. Another advantage of this novel technique of recording high-speed motion pictures is that when the processed film is played back or exhibited through a scanning member like that through which the exposures were made, the scanning member can be moved at any desired speed, or even stopped at any point, so that the motion of the subject can be readily analyzed. Furthermore, since the film is scanned at a known rate and there is thus a given time increment between each recorded subject position, such a film can be useful in studying the velocity and acceleration characteristics of high-speed subjects, as well as the appearance of the subject and its performance. Although each composite picture actually exposes only a very small percentage of the entire area of the film frame, 1/900 in the case to be described, or in each composite picture 899/900 of the complete picture is missing, the definition and detail obtained is comparable to that obtained with conventional movies where each successive frame of the film carries one complete picture. In this connection, it should be appreciated that the "frame" of film when using the present invention will not be as small as that of conventional 35 or 16 mm. movies, but will be a frame some 4" x 5", or larger in size.

In addition, motion recorded and viewed in this manner is exceptionally smooth, and the problem of moving the film and shutter in proper timed relation, as encountered in conventional methods of taking and projecting moving pictures, is eliminated. The fact that the scanning disk is moved continuously relative to the film frame during exposure so that the successive subject positions actually dissolve into one another, along with the fact that the subsequent subject positions are recorded at such high speed that the subject can change very little between each exposure, results in a motion picture which can be viewed through the moving scanning member without any other shutter, or a film movement, and still obtain a smooth motion picture or one minus "flicker" difficulty.

Since, in taking motion pictures according to this method the exposing process is a continuous one, the question of how many different composite position pictures can be recorded before double exposure takes place, becomes an important one, and one for which the answer is not immediately obvious. Normally, it would be assumed that every time the scanning apertures are moved a distance equal to their diameter, an entirely new picture would be recorded. On that basis, the number of pictures obtainable on a single frame of film would depend upon the size of the apertures and their relative spacing; the number of pictures depending upon how many times the apertures of the scanning member may be moved before double exposure results. However, it can be shown that this number of pictures determined in this manner is a minimum, and that actually many more position pictures can be obtained. With some thought, it becomes apparent that the absolute number of pictures of say the leading edge of a moving object is more a function of how many grains of emulsion are uncovered for a given travel of the apertures than a function of the number of aperture diameters uncovered. The total number of "frames" for a photographic method of this type would be determined by the accuracy of one's analysis of the exposed plate. Concrete basis for this claim is the fact that when an exposed high-speed composite picture plate is examined with an anlyzing disk, some motion can be observed when the disk is moved less than the diameter of an aperture therein. This phenomenon will undoubtedly be more understandable after reading the following description of an apparatus adapted for carrying out this novel method of photography and exhibiting the pictures so obtained.

Referring now to the drawings, a camera constructed in accordance with the present invention and adapted to carry out this method of photography will be described. While for purposes of disclosure we have shown an arrangement of parts so dimensioned as to produce a minimum of 900 different composite pictures on a single 4" x 5" photographic plate, it is pointed out, and will be appreciated by those skilled in the art, that the dimensions of the several parts could be modified over wide limits in accordance with the photographic problem at hand without going beyond the scope of the present invention.

Figure 1:
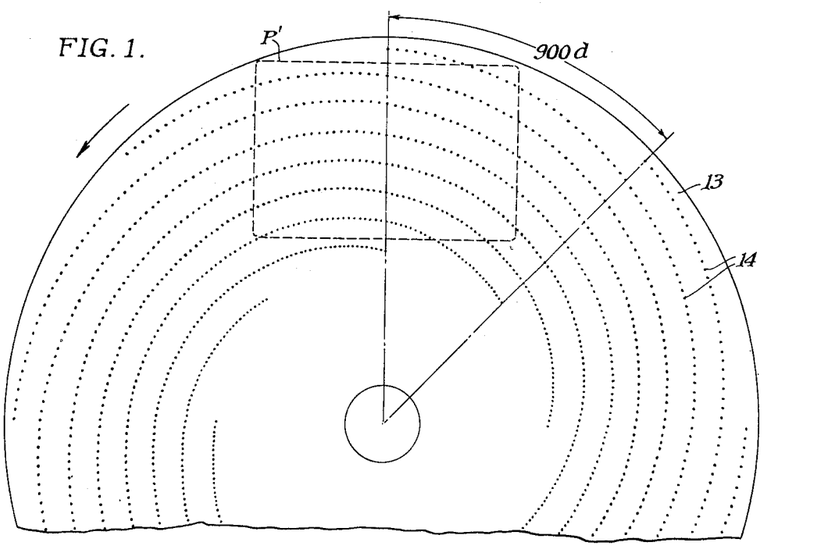
Fig. 1 is a partial front view of a scanning disk, with the apertures and their relative displacement obviously out of scale, through which exposures according to the present invention are made.
Figure 5:
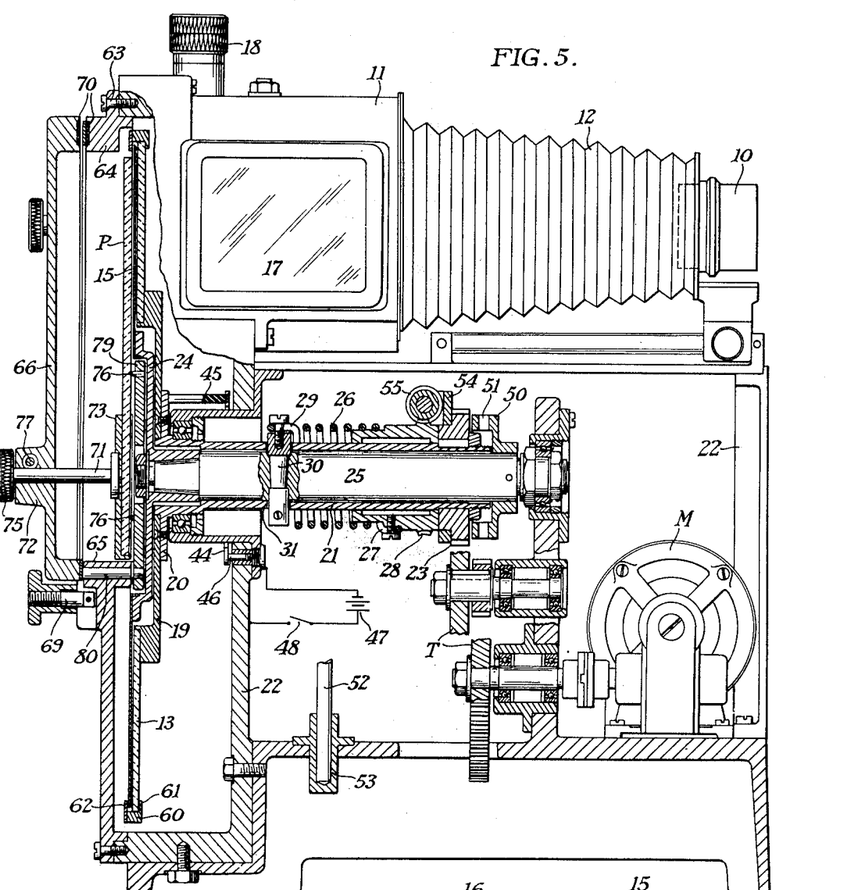
Fig. 5 is a side view, partly in section and partly in elevation, of a camera by the use of which the method of making photographs and exhibiting them according to the invention disclosed in the above-noted copending application may be practised.

Basically, the camera includes an objective lens 10 connected to a body portion 11 by a bellows 12, see Fig. 5. A photographic plate P to be exposed is positioned in the focal plane of the objective lens by means to be described fully hereinafter, and may include a 4" x 5" emulsion area that is covered by the image from the objective. Rotatably mounted in front of the photographic plate, and as close to the focal plane as is practically possible, is a scanning disk 13 of the form best shown in Figs. 1–3. In Fig. 1, this disk is shown in association with the 4" x 5" area of the photographic plate P to be exposed; the area of the plate covered by the image from the camera objective being indicated in this figure as P'. For reasons which will be obvious, the scale of the apertures in the scanning disk in these figures is far from true and the parts have only been indicated diagrammatically to show how the entire photographic plate is scanned by the disk 13 in two dimensions. Looking at Figs. 1–3, the major portion of the scanning disk 13 is opaque to the rays to which the photographic plate is sensitive and is made up of radial lines of light-transmitting apertures 14 having a diameter $d$, and on each radius these apertures are separated by a distance equal to thirty times their diameter or $30d$. One such radial line is labeled A in Fig. 2. Its adjacent neighbor radius B again has a series of apertures of diameter $d$ spaced $30d$ apart as in A, but in each case of corresponding apertures between radial lines A and B those of B are a distance of $d$ closer to the center of the disk than those of A. This is clearly illustrated in Fig. 3. Likewise, those of radial line C are $d$ closer to the center of the disk than those of B. Radial lines A, B and C are mutually separated by a distance $30d$. This process or spiraling in each radial series of apertures a distance $d$ from radius to radius is continued for additional equispaced radii until the radius Z is reached on which the outermost aperture is only a distance $d$ farther radially from the center of the disk than the first aperture of the next inner circumferential series beginning at radius A. Radius A' corresponds to radius A in that all apertures thereon are at the same distance from the center as the corresponding ones on radius A.

Figure 2:
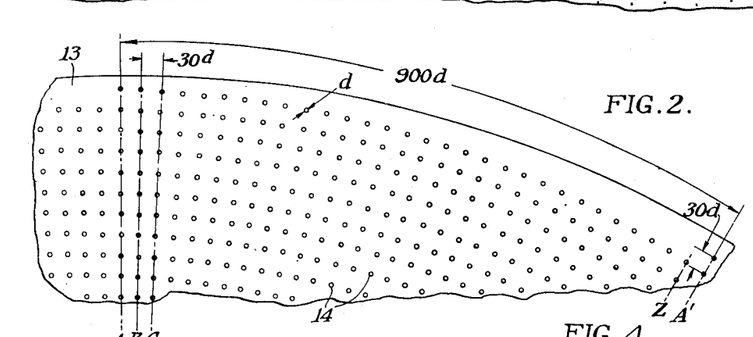
Fig. 2 is an enlarged view of a portion of the scanning disk shown in Fig. 1 and showing generally the light-transmitting apertures and their relative disposition and size. Here again, for reasons which will be obvious, the scale is not true—it is exaggerated.
Figures 3, 4:
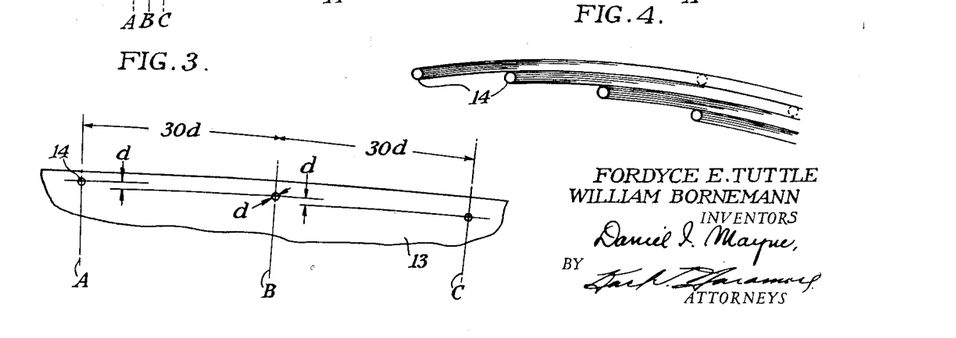
Fig. 3 is a further enlarged detail of a portion of the scanning disk including three successive apertures of one spiral series and indicating their relative spacing both circumferentially and radially of the disk as compared to their diameter in one special case used for purposes of disclosing the present invention.
Fig. 4 is a diagrammatic showing of how any four successive apertures in one spiral series scan a portion of the film in the focal plane as the disk is rotated relative thereto.

From Fig. 2 it can be seen that the outermost aperture on radius A can progress linearly as far as radius A (or $900d$) before it double exposes an emulsion spot previously exposed by its counterpart on radius A when radius A was at that position, and it was at A'. It will thus be seen that with this configuration of apertures the photographic plate is scanned in two directions (both circumferentially and radially of the disk) as the disk is rotated relative thereto and a minimum of 900 composite dot-like pictures are recorded on the 4" x 5" photographic plate before a double exposure occurs. As will be evident from an inspection of Fig. 1, this described configuration of apertures is repeated completely around the disk so that the disk can be continuously rotated, and at any time a series of exposures is to be made, the disk is in position to properly scan the photographic plate.

We have found that a scanning disk having apertures whose diameter $d$ is .0005" gives satisfactory results. In this case the apertures on each radius and in any circumferential series will then be spaced $30d$ or .015" apart and the disk will move through an arc of .450" in making at least 900 dot-like composite pictures on the 4" x 5" photographic plate. In order to cover a 4" x 5" photographic plate with this configuration of apertures, we have used a scanning disk 21" in diameter. The aperture configuration is disposed on the outer portion of the face of the disk so as to completely cover the 4" x 5" plate area at all times. Such a configuration of apertures of .0005" diameter when used to scan a 4" x 5" plate produces a dot pattern for each composite picture approximately 332 dots wide and 266 dots high; or, each composite picture is composed of some 88,445 dots. If it be remembered that at least 900 of these composite pictures are exposed on a single 4" x 5" photographic plate, then the plate has over 79,600,500 individual dot exposures thereon. This scanning disk need be rotated relative to the photographic plate at only 600 R. P. M. to attain a picture-taking rate of one million per second. By tripling this speed of rotation, or bringing it up around the normal speed of rotation of a conventional electric motor, a rate of exposure of three million per second can readily be attained. Likewise, slower exposure rates can be obtained by cutting down on the speed of rotation of the disk. If the diameter $d$ of the aperture is .001", then the space of the apertures ($30d$) will be .030" and the disk will have to move through an arc ($900d$) or .9" before double exposure begins and during which movement 900 pictures are taken on the photographic plate.

If the outermost apertures of the disk travel .450" before they double expose in the assumed 4" x 5" case, it is obvious that the innermost apertures covering a 4" x 5" plate will travel less than .450" before they double expose because of the loss in circumference with a fixed angle as one moves toward the center of the disk. This condition can be eliminated if one makes the diameter of the apertures progressively smaller as a radial series progresses toward the center. In the 4" x 5" case, the diameter of the outermost and innermost apertures would be in a ratio of 10:6; i. e., the innermost would be .0003". In order to avoid the difficulty of making apertures as small as .0003" in diameter, it is preferable to make that group of apertures passing through and adjacent the center point of the photographic plate or optical axis .0005" in diameter and increasing and decreasing the size of the apertures as one moves out and in, respectively, on a radius in order to give the above-mentioned 10:6 ratio. It will be appreciated that this aperture size difficulty is exaggerated in the illustrated case, because of the large size photographic plate (4" x 5") to be scanned, and because of the relatively small disk used to do the scanning. Should the size of the plate to be scanned be reduced, or the size of the disk be increased so that the scanning apertures move across the plate in substantially a straight line, or the aperture configuration is expanded circumferentially, then this difficulty can be avoided and all of the apertures could be the same size. This scanning disk may be made in a number of different ways, but we have found it particularly desirable to make it photographically on a glass photographic plate, because in this way the aperture size and spacing can be accurately controlled and maintained, and the glass plate is sufficiently rigid to hold its shape while rotating at high speeds.

We made the statement above that 900 composite pictures is the minimum number which will be exposed on the 4" x 5" photographic plate, and that actually the absolute number of pictures taken is more a function of how many grains of emulsion are uncovered per $900d$ movement of each aperture when taking motion pictures. A more comprehensive understanding of this phenomenon will be had from an examination of Fig. 4 which diagrammatically illustrates how four successive apertures of a circumferential series actually scan different linear areas of the photographic plate. If it be assumed that the disk is rotating counterclockwise at a continuous rate to take motion pictures, and each of the four apertures shown has moved from the dotted line position shown for two of them to the full-line position, it will be apparent that the leading edge of each aperture is continuously uncovering new emulsion, while the trailing edge is covering that previously exposed. It is obvious that when the apertures move a distance equal to their diameter they completely cover a previously exposed area and uncover an entirely new area, and that a complete new exposure is made. This effect produces the 900 pictures we speak of as a minimum. However, let us assume that during the time it takes an aperture to move only one-half of its diameter, the leading edge of the moving subject being photographed has moved from the position it was in when the aperture was in its last-assumed position. Then, so long as new emulsion is uncovered by the half diameter movement of the aperture, this new position of the leading edge of the subject will be exposed thereon. If we assume the same conditions for smaller increments of movements of the apertures, it will be found that for any increment of movement of an aperture, no matter how small, a separate exposure will be made on the newly uncovered emulsion. This reasoning will hold down to the point where the grain size or resolving power of the photographic emulsion limits the number of pictures which can actually be exposed on a given area of film. Accordingly, the total number of composite pictures which can be placed on a photographic plate by this method of exposure is determined by the accuracy of one's analysis of the exposed plate. Proof of this is found in the fact that when an exposed high-speed composite picture plate is examined with an analyzing disk, subject motion can be observed when the grid is moved less than the diameter of the apertures, or less than .0005''. This phenomenon is probably one reason why such smooth motion reproduction is available when examining these composite motion pictures through a continuously moving analyzing disk, since the successive pictures as viewed actually dissolve into one another without a sharp break as in the frames of conventional movie film.

When this method of photography is used for photographing motion pictures, some means must be provided for letting the image fall on photographic plate only so long as it takes the scanning disk to move relative to the plate through an arc equal in length to 900d or .450'' in the assumed case, in order to prevent double exposure of some or all of the composite pictures. There are different ways in which this may be accomplished including making the exposure by means of one of the conventional gaseous discharge lamps which gives a very bright illumination for a very short duration, and triggering the lamp by the subject to be photographed. Obviously, the duration of effective illumination of the chosen lamp should be equal to or less than the time required for the scanning disk to move through an arc equal to 900d.

Figures 6, 7:
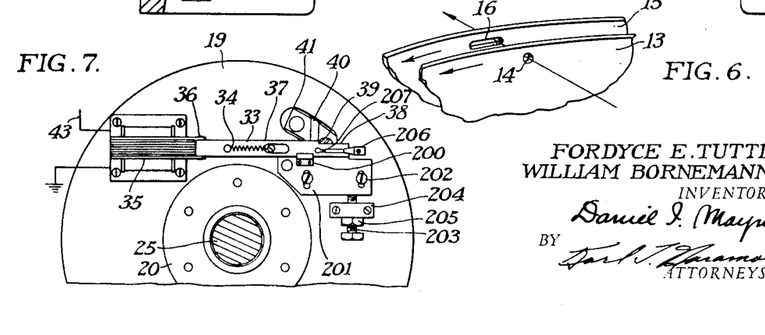
Fig. 6 is an enlarged perspective detail of a portion of the scanning disk and the capping shutter associated therewith and shown in operative relation to clearly point out the function and operation of the capping shutter.
Fig. 7 is an elevational view of one side of the supporting plate for the scanning disk and showing the releasable clutch mechanism between the scanning disk and the capping shutter.

Another way in which this may be accomplished, and which we deem the preferred way, is by the use of a capping shutter disk rotated in assembly with the scanning disk already described. As indicated in Fig. 6, this capping shutter disk 15 is identical in all respects to the scanning disk 13 except that the apertures 16 are now slots several times as long as the diameter of the apertures 14 in the scanning disk and slightly wider than the diameter of said apertures. The two disks rotate in assembly with their apertures out of alignment until the shutter disk is given an added rotational kick by a coiled spring, as will be described hereinafter. This indexing of the disks with respect to one another is triggered by the event to be photographed. The exposures take place as the apertures 14 in the scanning disk and the slots 16 in the shutter disk pass through registering positions as shown in Fig. 6; the length of the slot 16 and its velocity relative to the aperture 14 in the scanning disk being correct to expose all of the emulsion available to a given aperture during its translation of 900d. In its cocked position the shutter disk is held with its slots 16 out of alignment with the apertures 14 in the scanning disk so that no light can strike the photographic plate, and after being moved through the registering position shown by its spring drive arrives at a position with its slots 16 out of alignment with the apertures 14 in the disk 13.

Referring now to Figs. 5-15, we will describe a preferred form of camera by which this method of photographing and exhibiting pictures above described may be carried out in accordance with the present invention. As previously mentioned, the camera comprises an objective lens 10, a body portion 11, and a bellows 12. A photographic plate P is located in the focal plane of the objective and the lens can be focused on this plane by the use of a ground glass window 17 in the side wall of the body and a pivoted mirror, not shown, which may be swung into and out of the field of the objective by a knob 18 extending from the top of the camera body. The scanning disk 13 is rotatably disposed in front of the photographic plate as close as is practically possible, approximately .010'', and is fixed to a circular metal supporting plate 19, which is, in turn, fixed to a flange 20 on a driving sleeve 21. This sleeve is journaled in bearings supported by a frame 22 which also supports the camera and its associated mechanism and is rotated by a motor M through a gear train T including a spur gear 23 fastened to the right-hand end of the sleeve, looking at Fig. 5.

Figures 8, 9, 10, 11, 16:
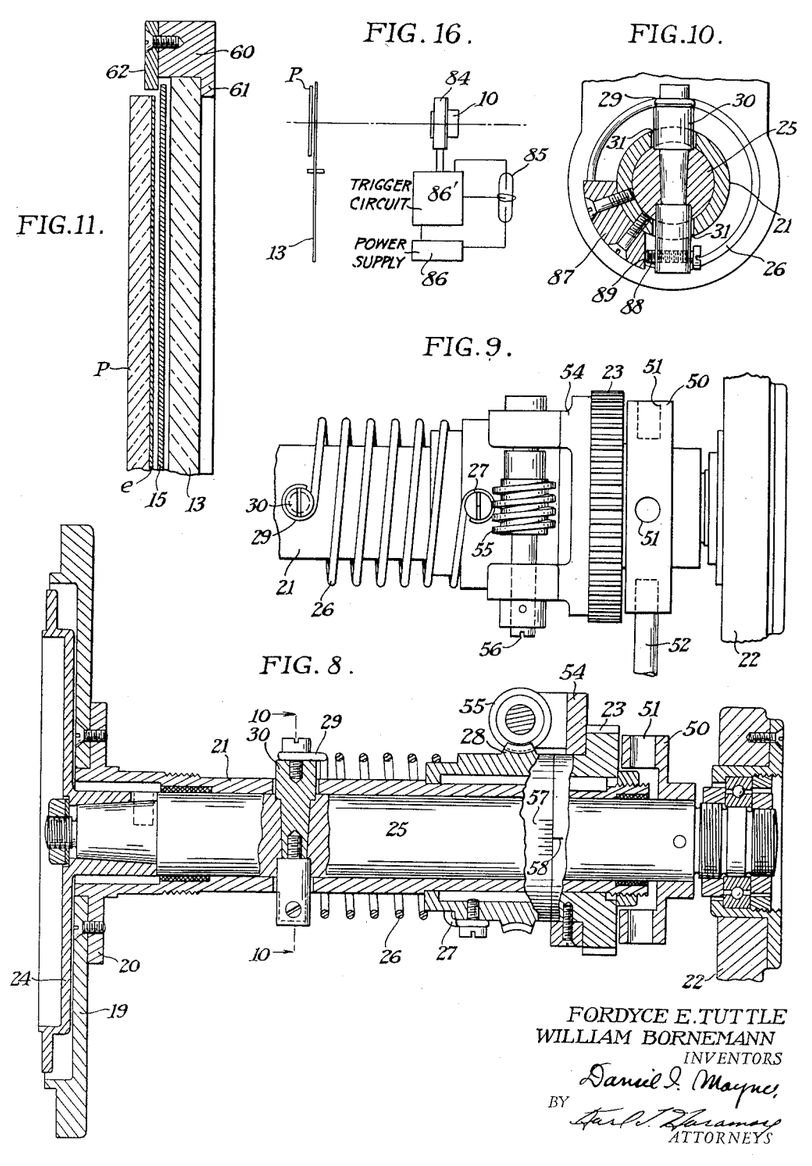
Fig. 8 is an enlarged sectional view of the driving means for both the scanning disk and the capping shutter.
Fig. 9 is an elevational detail looking down on the top of Fig. 8 and showing the means for cocking the capping shutter and varying the initial tension of the driving spring therefor.
Fig. 10 is a view taken substantially on line 10—10 of Fig. 8.
Fig. 11 is an enlarged sectional detail through the periphery of the scanning disk, capping shutter and photographic plate, and showing the relative size and spacing of these parts on an exaggerated scale, and showing how the capping shutter is confined to a given plane of rotation by a guiding flange on the periphery of the scanning disk.
Fig. 16 diagrammatically illustrates another embodiment of apparatus by which the method of photography under consideration can be accomplished without the use of a capping shutter, as in the first-mentioned embodiment.

The capping shutter disk 15 is rotatably disposed between the scanning disk 13 and the photographic plate P. Inasmuch as it is desirable to have the scanning disk located as close to the focal plane as possible, this capping shutter should be made of as thin material as possible. We have found that a .007'' thick steel disk provides a suitable capping shutter for the apparatus in question. The capping shutter is fastened in any suitable manner to a circular driving plate 24 which is, in turn, connected to the end of a drive shaft 25 rotatably mounted within the driving sleeve 21. A torsion spring 26 encircling the driving sleeve 21 has one end 27 fixed to a wormwheel 28 effectively fixed to sleeve 21, while its other end 29 is fastened to a driving pin 30 extending diammetrically through drive shaft 25 and through peripheral slots 31 in driving sleeve 21. This torsion spring tends to rotate the capping shutter 15 relative to the scanning disk 13 so as to move the slots 16 therein across the apertures 14 in the scanning disk to effect the exposure, and since the relative movement required is only a few thousandths of an inch at the periphery of the capping shutter (determined by the length of the slots 16 in the capping shutter) only a very minute relative movement is required between shaft 25 and driving sleeve 21. Hence, peripheral slots 31 need be only slightly longer than the diameter of drive pin 30.

The capping shutter disk 15 is adapted to be positively connected to the scanning disk 13 to be rotated in assembly therewith by a releasable clutch mechanism of the form best shown in Fig.

7. Slidably mounted on the face of the driving plate 19 is a bolt 33, normally moved to the right (looking at Fig. 7) by a spring 34 and adapted to be moved to the left upon energization of a solenoid 35 fastened to the plate 19 and to the plunger of which the bolt 33 is pivoted, as shown at 36. The top edge of the bolt 33 has a high surface 37 and a low surface 38 separated by a sharp riser portion 39. Fastened to the face of the drive plate 24 of the capping shutter is a latch member 40 which extends through an elongated slot 41 in the driving plate 19 of the scanning disk, so that its lower straight face is adapted to engage one of the surfaces 37 or 38 of the bolt 33. When the latch member 40 is in engagement with the high surface 37, the capping shutter is positively connected to the scanning disk with the torsion spring 26 cocked and the slots 16 in the shutter out of alignment with the apertures 14 in the scanning disk 13 and the disk and shutter can be rotated in assembly without passing light to the photographic plate. Now if the solenoid 35 is energized, the bolt 33 is pulled to the left to bring the low surface 38 of the bolt under the latch member 40, whereupon, due to the action of torsion spring 26, the capping shutter rotates relative to the scanning disk until latch member 40 engages the low surface of the bolt in which position the slots 16 in the shutter are again out of alignment with the apertures 14 in the disk 13. During this relative movement of the scanning disk and shutter, the slots 16 in the latter move across the apertures 14 in the former to make the desired 900 composite exposures on photographic plate. Because of the small relative rotation required between the shutter and scanning disk to make the exposure, the riser 39 between surfaces 37 and 38 is only in the neighborhood of a couple of one-thousandths of an inch, and this relative movement occurs at a very high rate.

When the capping shutter 15 is in its cocked position, the slots 16 therein should be displaced from alignment with apertures 14 in scanning disk 13 just sufficiently to obtain a complete blocking of the light through the two, but not enough to necessitate the shutter moving any unnecessary distance relative to the scanning disk for the slots 16 to start uncovering the apertures 14 in the disk. It is impractical to obtain such a close relative disposition of these two parts when mounting the described releasable clutch mechanism on the drive plates 19 and 24 so the following adjusting mechanism is provided to this end. A so-called rough adjustment is provided by mounting the guideway 200 for the sliding bolt 33 on a block 201 fastened to the face of drive plate 19 by a plurality of bolts 202 passing through elongated slots in the block. After loosening these bolts 202, the adjusting screw 203, carried by a threaded bracket 204 on the drive plate 19, is turned to cause its end to adjust the block 201 up and down. This causes the bolt 33 to move up or down and in turn shifts the shutter disk 15 relative to the scanning disk 13 through the latch member 40. A lock nut 205 may be provided to hold the screw 203 in its adjusted position. A fine adjustment may be accomplished by turning adjusting screw 206 which has its end in threaded engagement with a tapped opening in the end of bolt 33. The end of the bolt is split, as indicated at 207, and a conical portion on the screw 206 is adapted to engage a conical recess in the end of the bolt to produce a wedging action which tends to spread that portion of the bolt engaged by latch member 40 when the screw is turned down. These adjustments, in addition to serving to accurately position the slots 16 in shutter 15 relative to apertures 14 in scanning disk 13 when the two are in a cocked condition, may also be used, particularly the rough adjustment, to insure the latch member engaging the high surface 37 of bolt 33 as close to the riser 39 as possible when in a cocked condition to insure the solenoid moving bolt 33 far enough to release the latch member from the high surface 37.

Inasmuch as the solenoid rotates with the scanning disk 13, means must be provided to energize the solenoid while it is rotating. To this end, one side of the coil of the solenoid is grounded through the plate 19 to the frame 22. The other side of the solenoid coil is connected by a wire indicated at 43 in Figs. 5 and 7 to a contact ring 44 fixed to the driving plate 19 by a plurality of insulating posts 45 so as to rotate with the plate. This contact ring 44 is in constant wiping contact with an electrical brush 46 mounted in and insulated from the frame 22 and to which one side of a source of potential, such as battery 47, diagrammatically illustrated in Fig. 5, is connected. The other side of the source of potential is grounded to the frame 22 as diagrammatically indicated. The solenoid circuit will include a switch indicated at 48 in Fig. 5 and when taking high-speed motion pictures, this switch will be triggered by the action to be photographed.

Inasmuch as the torsion spring 26 must index the capping shutter 15 relative to the scanning disk 13 at a relatively high acceleration, while the two are rotating together in a cocked relation, it will be understood that this torsion spring must be a relatively strong one for a set of parts of the dimensions set forth. By way of example, it has been found that a torsion spring having a strength of 200 pounds per square inch is suitable. To permit cocking the capping shutter 15 against a spring of this strength, a collar 50 is fixed to the end of drive shaft 25 extending beyond driving sleeve 21 and which collar includes a plurality of sockets 51 spaced around its periphery and into which a rod 52 may be removably inserted, as shown in Fig. 9, to be grasped by the operator to move the shaft counterclockwise relative to driving sleeve 21. This cocking action requires but a very minute movement of the shaft 25 relative to sleeve 21 and when the shutter reaches its cocked position the bolt 33 is moved to the right by its spring 34 to move the high surface 37 thereof under the latch member 40 and positively connect the shutter and disk together with the shutter in a cocked condition. When rod 52 is not being used, it is placed in a socket 53 in the frame 22, as shown in Fig. 5.

As mentioned above, the rate of exposure is controlled by the speed at which the scanning disk 13 is rotated relative to the photographic plate P. Since the speed of rotation of the scanning disk is controlled by the speed of the motor M and the ratio of the gears in train T, the speed of exposure can be readily altered by changing the ratio of the gears in the train. However, as the exposure speed and, hence, speed of rotation of the scanning disk and capping shutter is altered, a change in the acceleration rate of the capping shutter is required and this involves a change in the force of the torsion spring 26 when in a cocked condition. In order to permit changing the force of a spring as heavy as this torsion spring, in accordance with different exposure speeds, the following structure is provided. Mounted on a bracket 54 fixed to a shoulder on the spur gear 23 fixed to the driving sleeve 21 is a worm 55 engaging the wormwheel 28 to which one end of the torsion spring is connected. Wormwheel 28 is actually rotatably mounted on the sleeve 21, although the ratio between the worm 55 and wormwheel 28 is such as to lock the wormwheel against rotation on the sleeve under the action of torsion spring 26. By placing a screw driver in the slot 56 in the end of the shaft of the worm, the worm may be turned to, in turn, rotate the wormwheel 28 and end 27 of spring 26 relative to the drive shaft 25 and driving sleeve 21. To facilitate proper adjustment of this torsion spring in accordance with different selected exposure speeds, the shoulder of the wormwheel 28 may be inscribed with a scale 57 cooperating with an index mark 58 on the shoulder of the spur gear fixed to the driving sleeve; said scale being properly calibrated in exposure speeds.

As clearly shown in Fig. 11, in order to eliminate any possibility of the capping shutter 15 accidentally deviating from its normal plane and engaging and scratching the emulsion off from the face of the photographic plate P, the scanning disk is provided with a metal rim 60, one edge of which includes a flange 61 in which the disk is seated; the other edge of the rim extending beyond the face of the disk and having attached thereto a guiding ring 62 which slightly overhangs the edge of the capping shutter and has its inner face lying in a plane slightly inside of the emulsion face e of the photographic plate. In normal operation the centrifugal forces acting on the capping shutter will be sufficient to keep it flat, despite the thinness of its gauge. Any tendency of the capping shutter to deviate from its plane will appear first at the extreme periphery so that the guiding ring 62 will be effective to keep it out of contact with the emulsion of the photographic plate. As for the danger of the capping shutter engaging the scanning disk 13 and scratching it, it must be remembered that these two parts rotate relative to one another only during the time an exposure is being made, and then only through an arc of a few thousandths of an inch, depending upon the length of the slots 16 in the capping shutter. It has been found that satisfactory operation is obtained if a .005" spacing is provided between the capping shutter 15 and the photographic plate P and a .002"–.003" spacing is provided between the shutter and the scanning disk 13. Assuming the shutter to be .007" thick, then the face of the scanning disk is spaced only .013" from the focal plane or photographic plate. It will be understood that if the scanning disk is made photographically on glass plate as assumed and shown, the emulsion surface of the disk will be adjacent the focal plane so that the scanning apertures will be as close as possible to this plane.

Figures 12, 13, 14, 15:
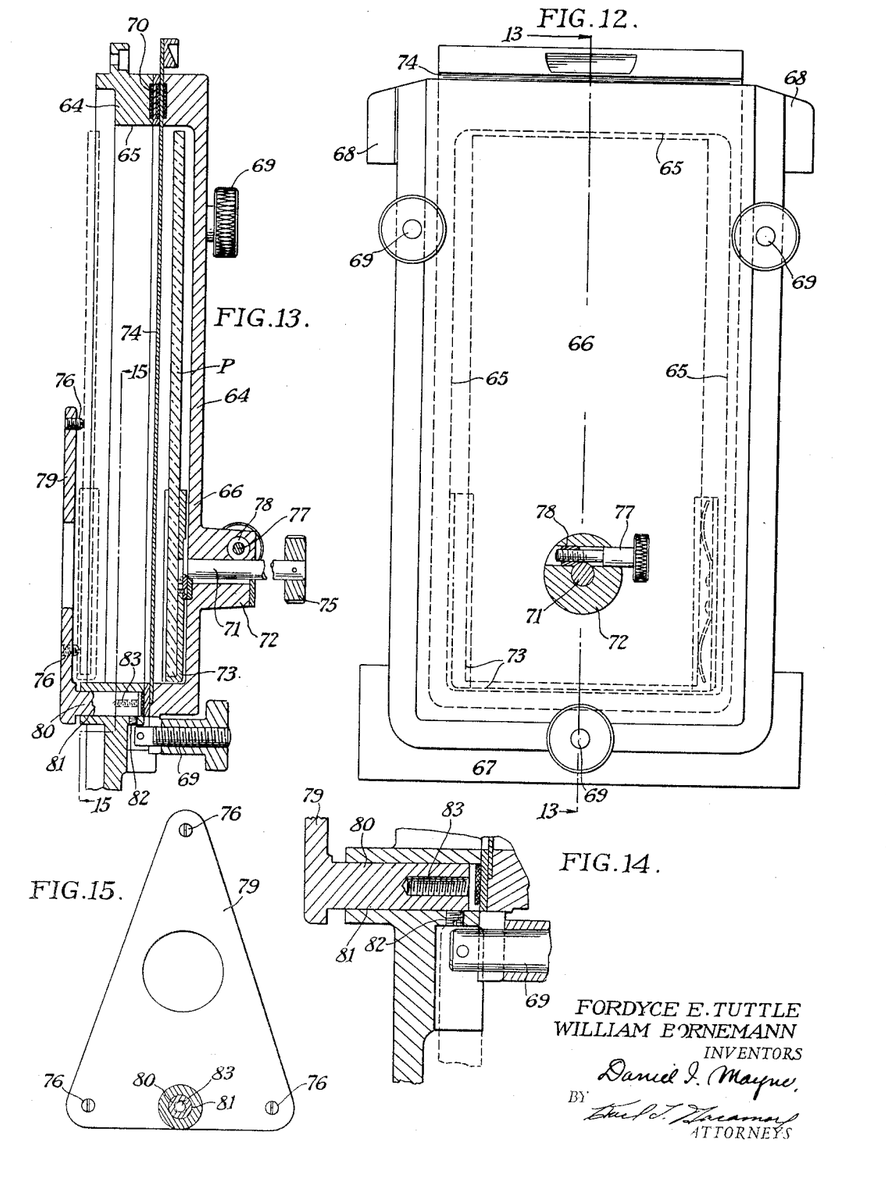
Fig. 12 is an enlarged rear view of that portion of the camera on which the plateholder is removably mounted and showing the plateholder mounted thereon.
Fig. 13 is a view taken substantially on line 13—13 of Fig. 12 and showing the means in the back of the camera for accurately locating the photographic plate in the focal plane.
Fig. 14 is an enlarged sectional detail of the lower corner of Fig. 13 and illustrating the manner of adjustably mounting the photographic plate locating means in the back of the camera.
Fig. 15 is an enlarged elevational detail of a preferred form of photographic plate locating means mounted in the camera back taken substantially on line 15—15 of Fig. 13.

It will be appreciated that some means must be provided for loading the photographic plate P into the camera without fogging the same and for accurately positioning it in the focal plane so that it won't be contacted by the rotating capping shutter. To this end, the rear of the camera body 11 and its supporting frame 22 has attached thereto by screws 63 a cover plate 64 which covers the lower portion of the capping shutter 15 and scanning disk 13 and is provided with a rectangular opening 65 over which a rectangular plate holder 66 is adapted to be placed, as shown in Figs. 5, 12 and 13. This plate holder 66 is in the form of a rectangular housing, the front wall of which is open and of a size to match the opening in the back of the cover plate 64. This plate holder is properly located on the cover plate by a U-shaped stop 67 on the cover plate which engages the bottom of the holder to position it vertically and two side stops 68 on the cover plate which engage the opposite sides of the holder adjacent its top to locate it horizontally. The plate holder is detachably held on the cover plate by three turnbuckles 69 which are pivoted to the cover plate 64 and adapted to engage notches in the flange around the open face of the plate holder. A gasket of velvet, plush, or other suitable material 70 is placed on the face of the margin surrounding the opening in the cover plate in order to make a light-tight joint between the plate holder and cover plate when the two are brought together.

Fixed to the inner end of a rod 71 slidably mounted in a boss 72 on the back of the plate holder is a U-shaped channel member 73 into which the lower end of the photographic plate P is inserted. It will be understood that the lower portion of the photographic plate supported in member 73 is not in the field of the objective lens and need not have emulsion thereon, unless two sets of pictures are to be made on one plate in which case the entire plate can be coated with emulsion and the plate reversed end-for-end in the member 73 between exposures. The forward end of the plate holder is provided with a retractable dark slide 74 which lies in front of the photographic plate when it is in its inserted position shown in Fig. 13, so that after the plate is loaded in the holder in a dark room, it can be brought out into the light for placing the holder on the camera without danger of fogging the film. After the loaded holder is properly placed on the cover plates 64, the dark slide is removed and the rod 71 is pushed inwardly by the use of knob 75 until the face of the photographic plate comes against three spaced locating stops 76 which accurately position the plate in the focal plane. The rod 71 is then clamped against movement by turning clamping screw 77 which draws a non-rotatable bushing 78 into clamping relation with the rod, as shown in Fig. 12.

In order to accurately initially position the plate locating stops 76, they are mounted on a triangular-shaped rigid plate 79 of the form best shown in Fig. 15. This plate 79 is, in turn, provided with a post 80 extending at right angles therefrom and slideably engaging a relatively long bore 81 formed in the rear wall of the cover plate with a good fit for rigidly supporting the plate 79 relative to the focal plane. Plate 79 is adapted to be held in any adjusted position by a set screw 82 engaging the post 80 thereof. In order to initially adjust the plate 79 and the locating stops 76 thereon, the set screw 82 is loosened and the plate 79 is moved parallel to the optical axis until the ends of the locating stops 76 lie in the focal plane of the objective. Then the set screw 82 is turned down to lock the plate 79 in this position. The end of post 80 is provided with a tapped hole 83 into which a screw can be threaded to provide a handle for shifting the plate 79 back and forth until properly adjusted.

Any one of several different procedures might be used to accurately adjust plate 79 relative to the focal plane of the camera and to insure a sufficient clearance between the photographic plate positioned thereby and the capping shutter disk. One way is to use a micrometer gauge.

Since the face of the cover plate 64 is a finished face, then by placing a glass plate equal in thickness to the photographic plate against the locating stop 76, the plate 79 can be adjusted until the glass plate is at such a distance from the noted reference surface to leave the desired .003" clearance between the face of the plate and the capping shutter 15. Another way is to place .003" shims between the capping shutter 15 and the scanning disk 13 and between the shutter and a glass plate having the same thickness as the photographic plate and then adjusting the plate 79 until the locating stops 76 engage the forward face of this test plate.

We will now describe the necessary procedure for taking high-speed motion pictures with the apparatus set forth. First, a photographic plate P is loaded in the plateholder in a dark room. Then the loaded film holder is placed on the cover plate 64 in covering relation with the opening 65 therein. The dark slide 74 is pulled out, the rod 71 is pushed forwardly until the face of the photographic plate strikes the locating stops 76 and then rod 71 is locked in position by clamping screw 78. Prior to pulling the dark slide out of the plate holder, the capping shutter 15 should be moved to a cocked position in which it is held by cooperation of bolt 33 and latch member 40, and in which position the slots 16 in the shutter are out of alignment with the apertures 14 in the scanning disk 13. Now the motor M is started and the capping shutter 15 and scanning disk 13 are allowed to come up to speed, i. e., approximately 500 R. P. M. for taking one million pictures per second. When the shutter and scanning disk have settled down to constant speed operation, the 900 exposures are ready to be made. To make the exposures, the solenoid 35 is energized which causes release of latch member 40 whereupon torsion spring 26 takes over to accelerate the shutter relative to the scanning disk in the direction of rotation of the two. Triggering of the solenoid is usually done by the subject to be photographed. The slight relative rotation of the shutter relative to the scanning disk allows the apertures 14 in the disk to be uncovered during the time it takes the disk to move a distance equal to 900 times the diameter of one of the apertures in the disk and thus make 900 separate composite exposures on the one photographic plate.

It will be appreciated that the exposed photographic plate after processing cannot be viewed in the ordinary way by the naked eye to observe the pictures thereon. If the plate were so viewed, all that would appear would be an apparently solidly exposed plate with possibly certain of the minute dot areas being of different density. However, if the exposed processed plate is viewed through an analyzing disk identical with the scanning disk through which it was exposed, or through the scanning disk itself, then the different dots making up each composite picture will be combined and those of other pictures covered so that the pictures will become apparent. This, of course, requires the analyzing grid being registered exactly with the exposed plate as the scanning disk was when the exposure was made. If the analyzing disk is moved relative to the exposed plate in the same manner as the scanning disk was during exposure, then the several different pictures on the plate will appear in the order in which they were exposed. Accordingly, if a high-speed motion subject is recorded on the plate, by rotating the analyzing disk at a slower rate than the scanning disk was moved during the exposure, then the motion of the subject can be slowed down to any speed for purposes of such analysis.

The best results are obtained when the exposed photographic plate is viewed by the use of transmitted light, for then the pictures appear as made up of points of light spaced on a dark background, and the spreading action of the light passing through the apertures of the analyzing disk help to eliminate the objectionable appearance of dark spaces between the points of light. If the subject is of the nature that allows it to be viewed satisfactorily as a negative then the exposed photographic plate need only be developed to a negative. However, this negative can be printed and processed to a positive transparency if the nature of the subject requires it or makes it desirable. The present camera can be readily used as an exhibiting device for viewing plates exposed thereon by using the scanning disk 13 as an analyzing disk. To this end, the processed exposed plate could be positioned in a holder much like the plate holder used in exposing so that the exposed plate could be repositioned in the focal plane of the objective lens in exactly the same position it assumed when exposed. To insure proper registration of the exposed plate with the disk 13, means should be provided for moving the plate in three directions relative to the disk. Now if a light source is placed behind the plate which will uniformly illuminate the plate, then the pictures thereon as analyzed by the disk can be projected on a screen by the taking objective of the camera. By rotating the disk 13, the successively exposed composite pictures will be presented in the order of their exposure and the speed of the subject, if a motion picture is on the plate, can be controlled by the speed of rotation of the disk.

Instead of using the capping shutter 15 to prevent double exposures as above set forth, it might be desirable in some instances to use short duration flash lamps to illuminate the subject and to rely upon the duration of the flash being short enough to prevent double exposure. In such a case the subject might be situated in a spot having insufficient illumination to normally affect the film so that no between-the-lens type of shutter would be required to prevent premature fogging of the film. On the other hand, the camera objective 10 could be mounted in a conventional between-the-lens type shutter having a built-in flash synchronizer, not shown, which would fire the lamp and open the shutter in synchronism. Such an arrangement of parts is indicated diagrammatically in Fig. 16 where 84 indicates a conventional between-the-lens type of shutter having a built-in synchronizer, 85 indicates a flash lamp of the gaseous discharge type having a short duration, 86 indicates the source of direct current for supplying power for flashing the lamp and 86' indicates the triggering circuit for firing the lamp, all as is well known in the prior art. The photographic plate and scanning disk are represented by the same reference characters as before, since their individual character and relative disposition will be the same as in the camera disclosed above.

It is also conceivable that it might be desired to record the motion of subjects whose rate of motion is slow enough to allow the apertures in the scanning disk 13 to pass light for as long as $1/800$ of a second before double exposure occurs. Should such be the case, then the capping shutter 15 could be done away with and the duration of exposure controlled by a conventional between-the-lens type shutter operating at the proper speed and triggered by the subject to be photographed.

To allow the capping shutter 15 to be selectively rendered inoperative, and non-existent, so far as the rest of the apparatus and its function is concerned, the following structure is provided. As best shown in Fig. 10, the driving sleeve 21 has fixed to its periphery a block 87 which lies adjacent the driving pin 30 extending through drive shaft 25. In threaded engagement with the end of driving pin 30 is a stop screw 88, the end of which is adapted to engage the radial face 89 of the block 87. To render the capping shutter 15 inoperative, or to hold it in a position where the slots 16 therein are in alignment with the apertures 14 in the scanning disk 13, the stop screw 88 is turned down so as to rotate the shutter relative to the disk until it is in its open position. When the capping shutter 15 is to be used, the stop screw 88 is backed off and out of engagement with the block 87.

This apparatus and method of photography carried out thereby is not limited to taking motion pictures, but could be used for photographing a plurality of different still subjects on the same photographic plate to be viewed in succession for presenting a changeable picture display. If the camera is to be used to this end, each exposure would be made with the disk 13 stationary relative to the photographic plate, and the disk will be indexed relative to the plate by a distance equal to the diameter of the apertures 14 between each exposure. Under these conditions the exposures could be made by the use of a conventional between-the-lens type shutter and the capping shutter would be moved to and held in its inoperative position by the means above described. With the dimensions given above by way of example it would be possible for one to photograph as many as 900 different still composite pictures on a single 4" x 5" photographic plate, each picture being substantially 4" x 5" in size so as to permit ready viewing without magnification. As before, these composite pictures when processed would be viewed and analyzed through a disk exactly like that through which the exposures were made, the disk being indexed relative to the processed plate in exactly the way it was during the exposure and thus provide a changeable picture program consisting of 900 different pictures.

Although we have shown and described certain specific embodiments of our invention, we are fully aware that many modifications thereof are possible. Our invention therefore is not to be limited to the particular details shown and described, but is intended to include all modifications coming within the scope of the appended claims.

Having thus described our invention, what we claim is new and desire to secure by Letters Patent of the United States is:

1. A photographic camera comprising in combination a camera body having an open back; an objective on the front wall of said camera body; means for locating a light-sensitive surface in the focal plane of said objective through said opening in the camera back so that a given area of said surface will be covered by the image projected by said objective; a scanning disk rotatably mounted substantially in the focal plane of said objective in front of said light-sensitive surface, and comprising a circular disk generally opaque to the rays to which said light-sensitive surface is sensitive and provided with a multiplicity of substantially equally spaced, individual dot-like, light-transmitting apertures, each having substantially the same diameter $d$, the apertures disposed in groups extending spirally of the face of said disk and each group of apertures being concentric with all others and spaced from the next adjacent group by $n$ times the diameter of the apertures, the number of groups being sufficient to cover one dimension of the sensitive surface to be scanned, each aperture of each group spaced from the next adjacent aperture in that group by a distance equal at least to the diameter of the apertures in a direction radially of the disk and by $x$ times the diameter of the apertures in a circumferential direction, whereby the disk can rotate through an arc equal to $n \times d$ before a given portion of said surface will be scanned by two apertures and a minimum of $n \times x$ separate dot-like pattern exposures will be made on said surface when the disk is rotated through an arc equal to $n \times d$, and means for rotating said scanning disk relative to said light-sensitive surface so that each of said apertures will expose different and previously unexposed portions of said surface in succession.

2. A photographic camera comprising in combination an objective; means for locating a light-sensitive surface in the focal plane of said objective so that a given area of said surface will be covered by the image projected by said objective; a scanning disk rotatably mounted substantially in the focal plane of said objective in front of said light-sensitive surface, and comprising a circular disk generally opaque to the rays to which said light-sensitive surface is sensitive and provided with a multiplicity of substantially equally spaced, individual dot-like, light-transmitting apertures, each having substantially the same diameter $d$, the apertures disposed in groups extending spirally of the face of said disk and each group of apertures being concentric with all others and spaced from the next adjacent group by $n$ times the diameter of the apertures, the number of groups being sufficient to cover one dimension of the sensitive surface to be scanned, each aperture of each group spaced from the next adjacent aperture in that group by a distance equal at least to the diameter of the apertures in a direction radially of the disk and by $x$ times the diameter of the apertures in a circumferential direction, whereby the disk can rotate through an arc equal to $n \times d$ before a given portion of said surface will be scanned by two apertures and a minimum of $n \times x$ separate dot-like pattern exposures will be made on said surface when the disk is rotated through an arc equal to $n \times d$; and means for rotating said scanning disk across said light-sensitive surface so that each of said apertures will expose different and previously unexposed portions of said surface in succession.

3. An apparatus for photographing high-speed motion pictures comprising in combination an objective; means for locating a light-sensitive surface in the focal plane of said objective so that a given area will be covered by the image formed by said objective; a scanning plate mounted substantially in the focal plane of said objective in front of said light-sensitive surface, and provided with a plurality of dot-like light-transmitting apertures individually spaced and collectively distributed so that said given area of the light-sensitive surface will be covered by a dot pattern of light passing through said apertures in any relative position of said surface and plate and said scanning plate and light-sensitive surface can move relative to one another in a given direction by a distance equal to more than fifty times the diameter of one of said apertures before reexposing a portion of said surface previously exposed by another aperture; means for continuously moving said scanning plate and said light-sensitive surface relative to one another at a relatively high speed; a shutter for cutting light off from said focal plane; and means opening said shutter and maintaining it open for only so long as the individual apertures are successively uncovering previously unexposed portions of said light-sensitive surface.

4. An apparatus for photographing high-speed motion pictures comprising in combination an objective; means for locating a light-sensitive surface in the focal plane of said objective; a scanning disk rotatably mounted substantially in the focal plane of said objective in front of said light-sensitive surface, and provided with a plurality of dot-like light-transmitting apertures collectively distributed over the disk so that in any position of the disk the surface will be covered by a dot pattern of light of substantially the same overall dimensions as the surface and said apertures individually spaced circumferentially and radially of said disk so that said disk can rotate through a given arc equal to many times the diameter of one of said apertures relative to said sensitive surface before any aperture will scan the same portion of said surface as scanned by any other aperture, means for continuously rotating said disk at a known speed, means for passing light through said scanning disk to said focal plane for a time equal to, or less than, the time required for said disk to rotate through said given arc to expose the sensitive surface and prevent double exposure of any portion thereof.

5. A high-speed motion picture camera comprising in combination an objective; means for locating a light-sensitive surface in the focal plane of said objective; a scanning disk rotatably mounted substantially in the focal plane of said objective in front of said light-sensitive surface, and provided with a plurality of similar dot-like light-transmitting apertures collectively distributed over the disk so that in any position of the disk the light-sensitive surface will be covered by a dot pattern of light of substantially the same overall dimensions as the surface and said apertures individually spaced so that said disk can rotate through a given arc relative to said sensitive surface before any aperture will scan the same portion of said surface as scanned by any other aperture; means for continuously rotating said disk at a known high rate of speed; a shutter normally cutting light off from said focal plane; and means for operating said shutter to pass light to said focal plane for a time equal to, or less than, the time required for said disk to rotate through said given arc to expose the sensitive surface but prevent double exposure of any portion thereof.

6. A high-speed motion picture camera comprising in combination an objective; means for locating a light-sensitive surface in the focal plane of said objective; a scanning disk rotatably mounted substantially in the focal plane of said objective in front of said light-sensitive surface, and provided with a plurality of dot-like light-transmitting apertures collectively distributed over the disk so that in any position of the disk the light-sensitive surface will be covered by a dot pattern of light of substantially the same overall dimensions as the surface and said apertures individually spaced so that said disk can rotate through a given arc relative to said sensitive surface before any aperture will scan the same portion of said surface as scanned by any other aperture; means for continuously rotating said disk at a known speed; a capping shutter located substantially in the focal plane adjacent said disk and movable between a normal closed position, wherein it covers the apertures in said disk, and an open position, wherein it uncovers the apertures in said disk to permit light to pass therethrough; and means for selectively moving said capping shutter to its open position at a given time, leaving it open not longer than it takes said disk to rotate through said given arc to completely expose the sensitive surface, and then closing it.

7. A high-speed motion picture camera comprising in combination an objective; means for locating a light-sensitive surface in the focal plane of said objective; a scanning disk rotatably mounted substantially in the focal plane of said objective in front of said light-sensitive surface, and provided with a plurality of dot-like light-transmitting apertures collectively distributed over the disk so that in any position of the disk the light-sensitive surface will be covered by a dot pattern of light of substantially the same overall dimesions as the surface and said apertures individually spaced so that said disk can rotate through a given arc relative to said sensitive surface before any aperture will scan the same portion of said surface as scanned by any other aperture; means for continuously rotating said disk at a known speed; a capping shutter in the form of a disk rotatably disposed substantially in the focal plane in parallel relation with said scanning disk, and provided with a plurality of light-transmitting apertures corresponding in number and disposition to the apertures in said scanning disk, the apertures in said shutter being elongated in the direction of movement thereof to uncover and, leave uncovered for a predetermined time, the apertures in said scanning disk when the two are rotated relative to one another; means tending to rotate said shutter relative to said scanning disk from a cocked position, wherein the elongated apertures therein are out of alignment with the scanning apertures, through an open position, wherein the apertures in the disk and shutter are aligned, and to a closed position to expose the sensitive surface; means for cocking said shutter; means for rotating said shutter and scanning disk at the same speed while the shutter is in its cocked position; and means for selectively releasing said shutter from its cocked position at a desired instant.

8. A high-speed motion picture camera comprising in combination an objective; means for locating a light-sensitive surface in the focal plane of said objective; a scanning disk rotatably mounted substantially in the focal plane of said objective in front of said light-sensitive surface, and provided with a plurality of dot-like light-transmitting apertures collectively distributed over the disk so that in any position of the disk the light-sensitive surface will be covered by a dot pattern of light of substantially the same overall dimensions as the surface and said apertures individually spaced so that said disk can rotate through a given arc relative to said sensitive surface before any aperture will scan the same portion of said surface as scanned by any other aperture; means for continuously rotating said disk at a known speed; a capping shutter in the form of a disk rotatably disposed substantially in the focal plane coaxially with said scanning disk, and provided with a plurality of light-transmitting apertures corresponding in number and disposition to the apertures in said scanning disk, the apertures in said shutter being elongated in the direction of movement thereof to uncover, and leave uncovered for a predetermined time, the apertures in said disk when the shutter and disk are rotated relative to one another; a spring tending to rotate said shutter relative to said scanning disk from a cocked position, wherein the apertures in the shutter and disk are out of alignment, through an open position, wherein the apertures in the disk and shutter are in alignment, and to a closed position to expose the sensitive surface; a releasable clutch for holding said shutter in its cocked position and connecting it in driving relation to said disk so that the two are driven at the same speed; and means for selectively releasing said clutch at a desired instant to free said shutter from its cocked position.

9. A high-speed motion picture camera according to claim 8 in which said releasable clutch comprises a driving lug fixed to said shutter; a driving bar mounted on said disk to move to and from a normal operative position in which said driving lug engages a portion thereof when the shutter is cocked to hold said shutter in a cocked position while positively connecting said disk and shutter for combined rotation; and a solenoid for moving said driving bar to its inoperative position when energized and in which position the driving lug is released to allow the shutter to move relative to the disk under the action of its spring driving means to make the exposure.

10. A high-speed motion picture camera comprising in combination an objective; means for locating a light-sensitive surface in the focal plane of said objective; a scanning disk rotatably mounted substantially in the focal plane of said objective in front of said light-sensitive surface, and provided with a plurality of dot-like light-transmitting apertures collectively distributed over the disk so that in any position of the disk the light-sensitive surface will be covered by a dot pattern of light substantially the same over-all dimensions as said surface, and said apertures individually spaced so that said disk can rotate through a given arc relative to said surface before any aperture will scan the same portion of said surface as scanned by any other aperture; a capping shutter located substantially in the focal plane adjacent said disk and rotatable relative to said disk between normal closed positions, wherein it uncovers the apertures in said disk, and an open position, wherein it uncovers the apertures in said disk to permit light to pass therethrough, means for rotating said disk and shutter together with the shutter in one of its closed positions and selectively rotating said shutter relative to said disk to open the shutter, said last mentioned means including a rotatable shaft on which said shutter is fixed; a sleeve encircling said shaft and carrying said disk; means for driving said sleeve at a known rate including a gear train; a selectively releasable clutch for positively connecting said shutter to said disk; and a spring tending to rotate said shutter relative to said disk when said clutch is released.

11. A high-speed motion picture camera according to claim 10 including means for changing the gear ratio of said train to change the known rate of rotation of said disk and the speed of exposure; and means for varying the initial tension in said spring in accordance with a selected speed of exposure to insure said shutter being open for only the given arc of rotation of said disk which will prevent double exposure of any portion of said sensitive surface.

12. A high-speed motion picture camera according to claim 10 including means for selectively moving said shutter to its open position and holding it in such position while the shutter and disk rotate together whereby the shutter is inoperative.

13. A high-speed camera comprising in combination an objective; means for locating a light-sensitive surface in the focal plane of said objective; a scanning disk rotatably mounted substantially in the focal plane of said objective in front of said light-sensitive surface and comprising a circular disk generally opaque to the rays to which the light-sensitive surface is sensitive, and provided with a multiplicity of substantially equally spaced, individual dot-like, light-transmitting apertures, each having substantially the same diameter $d$, the apertures disposed in groups extending spirally of the face of said disk, and each group of apertures being concentric with all others and spaced from the next adjacent group by $n$ times the diameter of the apertures, the number of groups being sufficient to cover one dimension of said sensitive surface to be scanned, each aperture of each group spaced from the next adjacent aperture in that group by a distance equal to the diameter of the apertures in a direction radially of the disk and by $x$ times the diameter of the apertures in a circumferential direction, whereby the disk can rotate through an arc equal to $n \times d$ before a given portion of said surface will be scanned by two apertures and a minimum of $n \times x$ separate dot-like pattern exposures will be made on said surface when the disk is rotated through an arc equal to $n \times d$, means for continuously rotating said disk at a known speed; a shutter normally cutting light off from said focal plane; and means for operating said shutter to pass light to said focal plane for a time equal to, or less than, the time required for said disk to rotate through said arc equal to $n \times d$ to expose the sensitive surface but to prevent double exposure of any portion thereof.

FORDYCE E. TUTTLE.
WILLIAM BORNEMANN.

REFERENCES CITED

The following references are of record in the file of this patent:

UNITED STATES PATENTS

| Number | Name | Date |
| --- | --- | --- |
| 1,000,323 | Butler | Aug. 8, 1911 |
| 1,260,682 | Kanolt | Mar. 26, 1918 |
| 1,719,756 | Clay | July 2, 1929 |
| 1,780,191 | Huebner | Nov. 4, 1930 |
| 2,185,610 | Stephen et al. | Jan. 2, 1940 |